July 10, 1956  R. M. E. DUNAND  2,754,477
WIDE RANGE ALTERNATING CURRENT IMPEDANCE BRIDGE
Filed July 11, 1952

INVENTOR
ROBERT MARIE ELIE DUNAND
BY Haseltine, Lake + Co.
AGENTS

United States Patent Office 2,754,477
Patented July 10, 1956

2,754,477

WIDE RANGE ALTERNATING CURRENT IMPEDANCE BRIDGE

Robert Marie Elie Dunand, Paris, France, assignor to Societe Alsacienne de Constructions Mecaniques, Paris, France, a corporation of France Application July 11, 1952, Serial No. 298,279

Claims priority, application France July 26, 1951

4 Claims. (Cl. 324—57)

In the technique of low intensity alternating electric currents, and more particularly in the technique of telecommunication, it is often useful to be able to measure, at various frequencies, impedances capable of varying within wide limits a modulus and phase angle, as a function of the measuring frequency. It is usual, in practice, to utilize, for such measurements, Wheatstone bridges, the diagonals of which are each provided with a pair of terminals and are respectively connected, one with a generator delivering a voltage of adjustable frequency and the other with a receiver for alternating current, and with four arms one of which is constituted by the impedance to be measured and the three others are conveniently constituted by calibrated resistances and variable capacitances.

In most usual types of A. C. Wheatstone bridges, two of the arms are constituted by two impedances which remain fixed during a measurement and the two others by the impedance to be measured and by an adjustable impedance, the adjustment of which makes it possible to obtain the balance condition for the bridge which corresponds to a zero value for the current in the circuit of the receiver. As this adjustment of the arm comprising the adjustable impedance must act on both the modulus of said impedance and its phase angle, this arm should comprise two variable calibrated impedances. The use, to this effect, of variable inductances is not recommended due to the fact that their effective resistance is liable to vary as a function of the frequency and of the intensity of the current flowing therethrough; the usual practice, therefore, is to use condensers and resistances, each one comprising a variable element, capable of varying in a continuous manner, and fixed elements associated according to the well known decade principle.

The present invention relates to bridges for measuring impedances capable of varying within a very wide range of moduli and phase angles, as a function of frequency, said bridges making it possible to carry out the measurement of impedances, the modulus and phase angle of which are initially unknown, while requiring, to this effect, only a small number of operations and ensuring at the same time a high accuracy.

The object of the present invention, more particularly, is to avoid, in a measuring bridge in which the modulus of the impedance to be measured may vary within very wide limits, the use of calibrated resistances of very high values, said resistances being difficult to build practically with sufficient accuracy.

This result is secured by the use of a special circuit which makes it possible to obtain, in one arm of the bridge, the equivalent of a very high resistance while using only resistance elements of usual values.

The present invention will now be described in greater detail hereinafter, with reference to the appended drawings, which illustrate, schematically, examples of embodiment of set-ups according to the invention and wherein.

Figure 1:
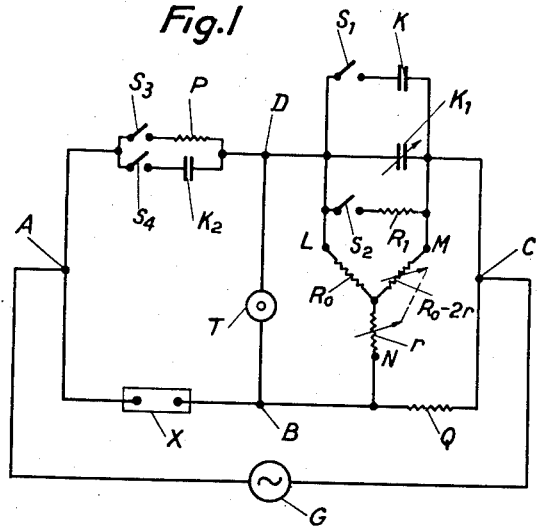
Figure 1 illustrates, schematically, the set-up of a measuring bridge in accordance with the invention.

Figure 1 shows schematically a measuring bridge according to the invention, comprising four arms AB, BC, CD, DA. The first arm AB is constituted by the impedance to be measured X, while the second arm BC comprises a fixed, calibrated resistance Q. The third arm CD includes a calibrated variable condenser $K_1$ which may be placed in parallel, if desired, through a switch $S_1$, with a calibrated fixed condenser K and also, through a switch $S_2$, with a fixed resistance $R_1$. The fourth arm DA of the bridge essentially comprises a fixed, calibrated resistance P and a fixed condenser $K_2$ which may be placed in service respectively, at will, by means of switches $S_3$ and $S_4$. An alternating current generator G is connected to the diagonal AC while a telephone receiver T is connected across the diagonal BD. Finally, in accordance with an original feature of the invention, there is provided a star-network comprising three calibrated resistances connected to a common point, said network comprising a calibrated resistance of fixed value $R_0$ and two calibrated adjustable resistances of respective values ($R_0-2r$) and $r$, respectively connected between the said common point and the three tips L, M, N of the star. As may be seen from Figure 1, L is directly connected to D, while M is connected to C and N to B.

Figure 2:
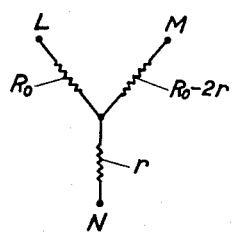
Figures 2 and 3 are diagrams illustrating the operation of part of the set-up of Figure 1.
Figure 3:
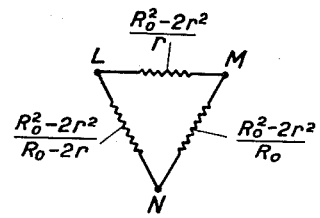

The balance conditions for a bridge thus constituted will be explained hereinafter, referring to the well known properties of the star-delta transformation in a network, and to Figures 2 and 3 illustrating said transformation.

Figure 2 shows the star LMN formed by three resistances $R_0$, ($R_0-2r$) and $r$, while Figure 3 shows the equivalent triangle LMN. Well known mathematical formulae show that the star LMN is equivalent to the triangle LMN provided that in the latter:

The resistance connected between L and M be equal to $$\frac{R_0^2-2r^2}{r}$$

The resistance connected between M and N be equal to $$\frac{R_0^2-2r^2}{R_0}$$

and the resistance connected between N and L be equal to $$\frac{R_0^2-2r^2}{R_0-2r}$$

Referring now to the diagram of Figure 1, it may be seen that, in that diagram, everything operates as if a resistance having a value $$\frac{R_0^2-2r^2}{r}$$

were connected between C and D, in parallel with the condensers (K, $K_1$), while a second resistance with a value $$\frac{R_0^2-2r^2}{R_0-2r}$$

were connected in parallel with the telephone receiver T and a third resistance having a value $$\frac{R_0^2-2r^2}{R_0}$$

were connected between the points B and C, in parallel with the branch of the bridge constituted by the resistance Q.

If it is now assumed that $r$ is much smaller than $R_0$, the value of the equivalent resistance connected between C and D may be replaced, to a satisfactory approximation, by $$\frac{R_0^2}{r}$$

and that of the resistance connected between B and C, in parallel with Q, by $R_0$. To show this, it is sufficient to take a numerical example. Assuming, for instance $R_0=10,000$ ohms and $r$ variable from zero to a maximum value R equal to 100 ohms, the maximum relative error made on the value of the equivalent resistance connected between L and M is:

$$\frac{\frac{R_0^2}{r}-\frac{R_0^2-2r^2}{r}}{\frac{R_0^2}{r}}=\frac{2r^2}{R_0^2}\leq\frac{2R^2}{R_0^2}$$

with $$\frac{2R^2}{R_0^2}=\frac{2.(100)^2}{(10,000)^2}=2.10^{-4}$$

Similarly, the relative error thus made on the equivalent resistance connected between M and N is:

$$\frac{R_0-\frac{R_0^2-2r^2}{R_0}}{R_0}=\frac{2r^2}{R_0^2}\leq 2.10^{-4}$$

It will be seen that this later error is also very small and that the conditions are substantially the same as if a fixed resistance having a value $R_0$ were connected in parallel with the resistance Q which can be taken into account in the value of Q, when calculating the bridge elements.

As regards the equivalent resistance between the points L and N, its value may vary to a slightly larger extent according to the value of $r$, but this has no importance as this resistance is in parallel with the telephone receiver T and is not involved in the balance of the bridge.

On the other hand, due to the fact that the equivalent resistance between the points L and M is substantially equal to $$\frac{R_0^2}{r}$$

it will be seen that its range of variation is very wide. With the numerical values assumed above and for the maximum value R of $r$, it is found that the value of this equivalent resistance is 1 megohm and is even larger for lower values of $r$. There is thus obtained, with the diagram of Figure 1, the equivalent of a measuring bridge equipped with calibrated resistances of very high values.

Figure 4:
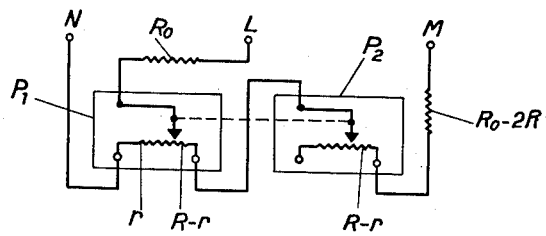
Figure 4 illustrates schematically one type of practical embodiment of the star-network constituting part of the invention.

Figure 4 shows a type of practical embodiment of the invention. In Figure 4, three branches form the star LMN, the first one ending on terminal L and comprising a fixed resistance $R_0$, the second one ending on terminal M and comprising a fixed resistance having a value $(R_0-2R)$ in series with two identical and variable resistances able to assume continuous variation by means of moving contacts and of the same value $(R-r)$. These two resistances may be constituted by two identical potentiometers $P_1$ and $P_2$, the resistances of which vary linearly as a function of the displacement of said moving contacts, which are mechanically ganged. The third tip of the star ends on the terminal N and comprises the variable resistance $r$, the value of which varies from zero to R and which may be constituted by a portion of the second of said potentiometers.

The variable equivalent resistance element thus constituted between L and M provides a resistance which varies, with the above mentioned numerical values, from 1 megohm to infinity, according to the setting of the ganged potentiometers. For constituting a resistance capable of assuming lower values, there may be associated, with this element, fixed resistances assembled into decades and the values of which may extend, for instance, from 1 megohm to 1000 ohms. One of these resistances, shown in Figure 1 at $R_1$, may be connected or disconnected at will by means of the switch $S_2$. The association of such an adjustable resistance in parallel with a condenser capable of varying continuously between zero and one thousandth of one microfarad and additional fixed capacities varying by decades from one thousandth of one microforad to ten microfarads, makes it possible to constitute an impedance the modulus and phase angle of which are adjustable within a very wide range.

The described device is also so designed that for measuring unknown impedances having phase angles of any sign, there may be used, in the DA branch of the bridge, either a resistance P if the phase angle of the impedance X to be measured is positive, or a capacitance $K_2$ if this phase angle is negative.

It is known that elements such as P, Q, $K_2$, in the bridge, may alternately be given several fixed values, amongst which the operator will select the most favourable before making a measurement, so as to increase the ranges of moduli and phase angles of the impedance to be measured, in which it is possible to balance the bridge.

What I claim is:

1. An alternating current measuring bridge, for measuring impedances varying in modulus and phase angle within wide limits, said bridge having four series-connected arms, each arm having two end terminals, and two diagonals, the impedance to be measured constituting a first arm of the bridge and the second and fourth arms of the bridge being adjacent thereto and being constituted respectively by a first fixed resistance and by a first standard impedance, the fourth arm including an adjustable condenser, the third arm including a second standard impedance, an alternating current source and an alternating current receiver being included respectively in the one and in the other of said diagonals and a star network made of a fixed resistor of value $R_0$ and of a first adjustable resistor of value $r$ which is much smaller than $R_0$ and a second adjustable resistor of value $(R_0-2r)$, the three terminals of said star network being respectively connected to the terminal common to said first and second arms and to the terminals of the third adjoining arm, wherein the terminal of said network connected to the terminal common to said third and fourth arms is that pertaining to said fixed resistor and wherein said first and second adjustable resistors are mechanically ganged together and arranged so that their respective values vary in opposite directions, the variation of the value of said first adjustable resistor being twice as rapid as the variation of the value of said second adjustable resistor.

2. A bridge as claimed in claim 1 wherein said second standard impedance is a standard resistor.

3. A bridge as claimed in claim 1 wherein said second standard impedance is a standard condenser.

4. A bridge as claimed in claim 1 wherein $R_0$ is substantially equal to 10,000 ohms and $r$ has a maximum value of substantially 100 ohms.

References Cited in the file of this patent

UNITED STATES PATENTS

| 1,375,414 | Osborne | Apr. 19, 1921 |
| 2,326,274 | Young | Aug. 10, 1943 |